(12) United States Patent
Al Hasan et al.

(10) Patent No.: US 11,544,259 B2
(45) Date of Patent: Jan. 3, 2023

(54) CRF-BASED SPAN PREDICTION FOR FINE MACHINE LEARNING COMPREHENSION

(71) Applicant: KONINKLIJKE PHILIPS N.V., Eindhoven (NL)

(72) Inventors: Sheikh Sadid Al Hasan, Cambridge, MA (US); Tao Li, Cambridge, MA (US); Vivek Varma Datla, Ashland, MA (US)

(73) Assignee: Koninklijke Philips N.V., Eindhoven (NL)

(*) Notice: Subject to any disclaimer, the term of this patent is extended or adjusted under 35 U.S.C. 154(b) by 563 days.

(21) Appl. No.: 16/681,945

(22) Filed: Nov. 13, 2019

(65) Prior Publication Data
US 2020/0175015 A1 Jun. 4, 2020

Related U.S. Application Data

(60) Provisional application No. 62/772,764, filed on Nov. 29, 2018.

(51) Int. Cl.
*G06F 17/00* (2019.01)
*G06F 16/2453* (2019.01)
(Continued)

(52) U.S. Cl.
CPC ...... *G06F 16/24534* (2019.01); *G06F 16/248* (2019.01); *G06F 40/205* (2020.01);
(Continued)

(58) Field of Classification Search
CPC ............. G06F 16/24534; G06F 16/248; G06F 40/205; G06F 40/30; G06F 16/355;
(Continued)

(56) References Cited

U.S. PATENT DOCUMENTS

| 11,093,556 B2* | 8/2021 | Li | G06F 16/367 |
| 2013/0226847 A1* | 8/2013 | Cruse | G06N 5/04 |
| | | | 706/12 |

(Continued)

FOREIGN PATENT DOCUMENTS

| CN | 108415977 A | * 8/2018 | ......... G06F 16/3329 |
| CN | 108959246 A | * 12/2018 | |

(Continued)

OTHER PUBLICATIONS

Seo, M. et al., "Bidirectional Attention Flow for Machine Comprehension". Published as a conference paper at ICLR 2017. arXiv:1611.01603 [cs.CL].

(Continued)

*Primary Examiner* — Hassan Mrabi

(57) ABSTRACT

A method for determining, from a document, an answer to a query using a query answering system, comprising: (i) encoding, using an encoder, one or more documents; (ii) encoding a received query; (iii) generating, using an attention mechanism, a query-aware document representation comprising alignment between one or more words in one of the plurality of documents and one or more words in the query; (iv) generating, using a hierarchical self-attention mechanism, a word-to-sentence alignment of the query-aware document representation; (v) labeling, using a conditional random field classifier, each of a plurality of words in the word-to-sentence alignment with one of a one of a plurality of different sequence identifiers, resulting in possible labeled answering spans; and (vi) generating, from the one or more possible labeled answering spans, a response to the query.

14 Claims, 7 Drawing Sheets

300

(51) Int. Cl.
  *G06F 16/248* (2019.01)
  *G06N 3/04* (2006.01)
  *G06F 40/30* (2020.01)
  *G06F 40/205* (2020.01)
(52) U.S. Cl.
  CPC ........... *G06F 40/30* (2020.01); *G06N 3/0445* (2013.01); *G06N 3/0454* (2013.01)
(58) Field of Classification Search
  CPC ..... G06F 40/35; G06F 40/284; G06N 3/0445; G06N 3/0454; G06N 3/08; G06N 5/041; G06N 7/005; G06N 20/00
  See application file for complete search history.

(56) References Cited

U.S. PATENT DOCUMENTS

| | | | | |
|---|---|---|---|---|
| 2016/0154631 | A1* | 6/2016 | Cruse | G06F 8/35 717/104 |
| 2017/0270409 | A1* | 9/2017 | Trischler | G06F 40/30 |
| 2017/0337479 | A1* | 11/2017 | Trischler | G06F 40/279 |
| 2018/0357562 | A1* | 12/2018 | Hofman | G06N 5/022 |
| 2019/0079739 | A1* | 3/2019 | Cruse | G06F 8/315 |
| 2019/0156220 | A1* | 5/2019 | Zhu | G06N 7/005 |
| 2019/0311064 | A1* | 10/2019 | Chakraborty | G06F 16/90332 |
| 2022/0138432 | A1* | 5/2022 | Galitsky | G06F 40/35 704/9 |

FOREIGN PATENT DOCUMENTS

| | | | |
|---|---|---|---|
| CN | 109033068 | A * | 12/2018 |
| CN | 109460553 | A * | 3/2019 |
| CN | 109492227 | A * | 3/2019 |
| CN | 110928982 | A * | 3/2020 |

OTHER PUBLICATIONS

Peters, M.E. et al., "Deep Contextualized Word Representations". Proceedings of NAACL-HLT, pp. 2227-2237. New Orleans, Louisiana, Jun. 1-6, 2018.

* cited by examiner

CRF-BASED SPAN PREDICTION FOR FINE MACHINE LEARNING COMPREHENSION

CROSS-REFERENCE TO RELATED APPLICATIONS

This application claims priority to U.S. Provisional Patent Application Ser. No. 62/772,764, filed on Nov. 29, 2018, and entitled "CRF-BASED SPAN PREDICTION FOR FINE MACHINE LEARNING COMPREHENSION," the entire contents of which are incorporated herein by reference.

FIELD OF THE DISCLOSURE

The present disclosure is directed generally to methods and systems for determining, from a document, the best answer to a query using machine comprehension.

BACKGROUND

Machine comprehension (MC) is one of the most important tasks in natural language processing (NLP). The goal is to provide the best possible answer to a query based on the underlying context such as a paragraph or document. The query refers to a question posed over the information expressed in the paragraph or a document. And the answer refers to a piece of text present in the document. This is a challenging task as it requires the machine to understand and reason in natural language. As such, machine comprehension can be considered as one of the building blocks of various real-world applications such as search engine functioning, customer support, question answering, recommendation, summarization, chatbots, and many other applications.

The goal of span-based machine comprehension is to identify a consecutive span of text from a given document to answer a question. Traditional classifiers such as span-based machine comprehension attempt to locate the starting and the ending word positions within the document, such that the words between these words form the answer to the query. However, traditional classifiers suffer many different problems. For example, while traditional classifiers are good at approximating the location of the answer within a long sequence of text such as a document, they have difficulty precisely locating the answer within the text. As another example, traditional classifiers are unable to properly analyze or deal with the words between the identified starting and the ending word positions.

SUMMARY OF THE DISCLOSURE

There is a continued need for automated machine comprehension methods and systems that provide an answer to a query. In addition, there is a continued need for methods and systems that properly parses all the text within an area of a document identified as containing answer, in order to generate a succinct, fully responsive answer. The present disclosure is directed to inventive methods and systems for determining, from a document, an answer to a query using a query answering system. Various embodiments and implementations herein are directed to a deep learning architecture and method that performs a conditional random field (CRF)-based span prediction for fine machine reading comprehension. The system encodes a plurality of documents, and encodes a received query. From that, the system generates a query-aware document representation comprising alignment between one or more words in one of the plurality of documents and one or more words in the query. The system then generates a word-to-sentence alignment of the query-aware document representation. Each of a plurality of words in the generated word-to-sentence alignment is labeled, using a conditional random field (CRF) classifier with one of a one of a plurality of different sequence identifiers. A response to the query is generated from the words and their associated sequence identifiers. That response can then be provided to a user.

Information expressed in natural language can be broad and diverse. The need for MC systems arise in order to facilitate the users to efficiently focus on the most relevant and interesting content in a potentially larger context. Specifically, a MC system is given a document containing a mass of information, and a query that represents the point of interest. The problem is to provide an answer by selecting a span of text in the document. Current deep learning-based MC systems perform close to a human level on relatively simpler datasets, while far from being robust on challenging ones. This is mostly because even though a system can roughly estimate a broad area of focus in the document, it essentially fails to select the exact span. In the embodiments described herein, a solution to this issue is described that includes a system to carefully read and reason through the interested focus area, thus delivering better answers to questions.

Various embodiments utilize a strategy for span-based machine comprehension task by transforming the span selection problem into a sequence labeling one, such that every word will account in model prediction. Specifically, finding a consecutive span of text can be viewed as a sequence labeling problem, where each word in the document associates with a label in $\{B; I; O\}$. The label B represents the starting word of the answer, I denotes the word is inside of the answer, and O says the word is outside of the answer. With this sequence labeling problem, some embodiments adopt a global inference layer using CRF on the top of an existing neural network. The CRF layer aims to predict a sequence of labels that maximizes its scoring outcome. Thus it can easily generalize to any span-based neural model. Some approaches model individual word semantics when prediction answer spans. Some such approaches introduce an extra term in loss function by measuring generated text with ground truth answer. Various embodiments described herein instead attach a CRF layer on top of an existing network architecture without redesigning a new one.

Generally, in one aspect, a method for determining, from a document, an answer to a query using a query answering system is provided. The method includes: (i) encoding, using an encoder of the query answering system, one or more documents; (ii) encoding, using the encoder, a received query; (iii) generating, using an attention mechanism of the query answering system, a query-aware document representation comprising alignment between one or more words in one of the plurality of documents and one or more words in the query; (iv) generating, using a hierarchical self-attention mechanism of the query answering system, a word-to-sentence alignment of the query-aware document representation; (v) labeling, using a conditional random field (CRF) classifier of the query answering system, each of a plurality of words in the generated word-to-sentence alignment with one of a one of a plurality of different sequence identifiers, resulting in one or more possible labeled answering spans; and (vi) generating, from the one or more possible labeled answering spans, a response to the query.

According to an embodiment, the method further includes the step of providing the generated response.

According to an embodiment, the plurality of different sequence identifiers comprises three different sequence identifiers, comprising B (beginning word), I (inside word), and O (outside word), or a representation thereof.

According to an embodiment, the attention module is a bidirectional attention module.

According to an embodiment, the steps of encoding further include: encoding the query and the document into a word embedding using a context independent word vector library; and applying a BiRNN on the word embeddings for the query and document.

According to an embodiment, the step of labeling each of a plurality of words in the generated word-to-sentence alignment using a (CRF) classifier comprises: applying a linear layer on vectors representing the plurality of words to generate one or more possible labeled answering spans (S); applying a Viterbi algorithm analysis to the one or more possible labeled answering spans (S), wherein the Viterbi algorithm analysis is configured to predict one or more of the labeled answering spans (S) with a highest likelihood of a high score, to generate a list of one or more labeled answering spans with a high likelihood of a high score (S'); and applying an argmax function to select, from the list of one or more labeled answering spans with a high likelihood of a high score (S'), a labeled answering span with the maximal score.

According to an embodiment, the labeled answering span with the maximal score is the answer to the query.

According to an embodiment, the step of labeling each of a plurality of words in the generated word-to-sentence alignment using a (CRF) classifier comprises a transition table, the transition table configured to direct the system to only generate labeled answering spans (S) with approved transitions. According to an embodiment, the transition table ensures that the generated labeled answering spans (S) comprise a beginning word sequence identifier at the beginning of the span. According to an embodiment, the transition table ensures that the generated labeled answering spans (S) does not comprise a transition from an inside-the-span sequence identifier to a beginning-word sequence identifier.

According to an aspect is a system configured to determine an answer to a received query. The system includes: a plurality of documents; a received query; and a processor configured to: (i) encode, using an encoder, one or more of the plurality of the documents; (ii) encode, using the encoder, the received query; (iii) generate, using an attention mechanism, a query-aware document representation comprising alignment between one or more words in one of the plurality of documents and one or more words in the query; (iv) generate, using a hierarchical self-attention mechanism, a word-to-sentence alignment of the query-aware document representation; (v) label, using a conditional random field (CRF) classifier, each of a plurality of words in the generated word-to-sentence alignment with one of a one of a plurality of different sequence identifiers, resulting in one or more possible labeled answering spans; and (vi) generate, from the one or more possible labeled answering spans, a response to the query.

According to an aspect is a system configured to determine an answer to a received query. The system includes: a plurality of documents; a received query; and a processor configured to: (i) encode, using an encoder, one or more of the plurality of the documents; (ii) encode, using the encoder, the received query; (iii) generate, using an attention mechanism, a query-aware document representation comprising alignment between one or more words in one of the plurality of documents and one or more words in the query; (iv) generate, using a hierarchical self-attention mechanism, a word-to-sentence alignment of the query-aware document representation; (v) label, using a conditional random field (CRF) classifier, each of a plurality of words in the generated word-to-sentence alignment with one of a one of a plurality of different sequence identifiers, resulting in one or more possible labeled answering spans; and (vi) generate, from the one or more possible labeled answering spans, a response to the query; wherein a memory of the system is configured to store or comprise at least: (i) a transition data structure utilized to direct the system to only generate labeled answering spans with a plurality of approved transitions from one sequence identifier to another; and (ii) a data structure comprising generated authorized labeled answering spans with a high likelihood of a high score, from which the response to the query is generated.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. The figures showing features and ways of implementing various embodiments and are not to be construed as being limiting to other possible embodiments falling within the scope of the attached claims. Also, the drawings are not necessarily to scale, emphasis instead generally being placed upon illustrating the principles of the various embodiments.

DETAILED DESCRIPTION OF EMBODIMENTS

Figure 1:
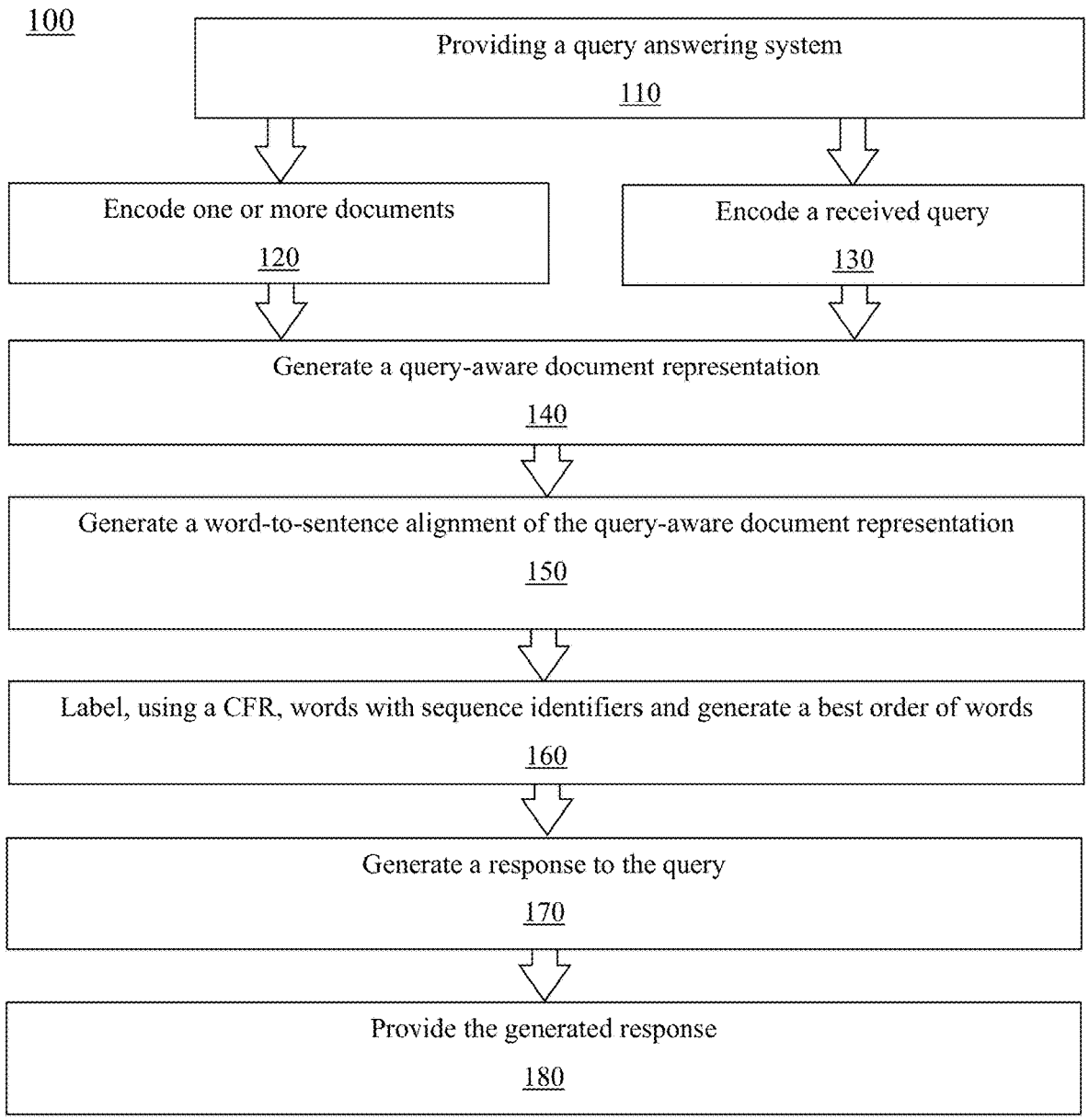
FIG. 1 is a flowchart of a method for determining an answer to a query using a query answering system, in accordance with an embodiment.

The present disclosure describes various embodiments of a system and method to determine, from a document, the best answer to a query using machine comprehension. More generally, Applicant has recognized and appreciated that it would be beneficial to provide a method or system that utilizes (CRF)-based span prediction for fine machine reading comprehension. The system encodes a plurality of documents, and encodes a received query. From that, the system generates a query-aware document representation comprising alignment between one or more words in one of the plurality of documents and one or more words in the query. The system then generates a word-to-sentence alignment of the query-aware document representation. Each of a plurality of words in the generated word-to-sentence alignment is labeled, using the conditional random field (CRF) classifier with one of a one of a plurality of different sequence identifiers. A response to the query is generated from the words and their associated sequence identifiers, which can then be provided to a user.

According to an embodiment, the system is built on top of an attention model for machine comprehension which consists of four stages: encoder, attention, merging, classification. The following equations present a high-level formulation of the system, although they are provided only as an example and many other formulations are possible:

$$\overline{D}, Q = f(D), f(Q) \tag{Eq. 1}$$

$$\tilde{A}, \vec{A} = g(D, Q) \tag{Eq. 2}$$

$$\overline{D}' = h(D, Q, \tilde{A}, \vec{A}) \tag{Eq. 3}$$

$$y = u(\overline{D}') \tag{Eq. 4}$$

where D represents the document (m×d matrix), Q is the query (n×d matrix), f denotes the encoder function, g yields bidirectional attentions (i.e. $\tilde{A}$ and $\vec{A}$), h is the merging function that blend features from question into document, and u is a B, I, O classification layer that outputs a sequence predicted labels y.

According to an embodiment, the goal of an encoder function (as in f in Eq. 1) is to initiate a pass of feature transformation for later operations (e.g. attention). Various embodiments comprise a standard approach that uses recurrent network to this end. Specifically, some embodiments use standard bidirectional Gated Recurrent Networks (GRU) which takes as the input word and character embeddings. A 2-layer highway networks is used to fuse features from word level and character level.

With a long document, important information tends to be diluted in sequential encoding. To deal with this issue, the system utilizes a hierarchical self-attention layer that first distills at sentence level, then transfer back to word level for better contextual encoding. The following equations provide a high-level formulation of the hierarchical self-attention layer, although they are provided only as an example and many other formulations are possible:

$$D_s = \text{BiGRU}_s(D) \tag{Eq. 5}$$

$$D, Q = \text{BiGRU}(D), \text{BiGRU}(Q) \tag{Eq. 6}$$

$$A_s = \sigma(D_s^T D) \tag{Eq. 7}$$

$$\overline{D} = [A_s^T D_s; D] \tag{Eq. 8}$$

where BiGRUs is a sentence encoder that outputs a vector per sentence, BiGRU is a word level encoder, σ is a row-wise softmax, and [;] is concatenation, $A_s$ is sentence-to-word attention matrix of shape. The resulting $\overline{D}$ carries word semantics with sentence-level information. For the question Q, the system can optionally use only word level encoding because typically the question is short, but other options are possible including for longer queries.

According to an embodiment, the attention layer (such as g in Eq. 3) is configured to align related words between the document D and the question Q. The output of the attention layer is two attention matrices: $\tilde{A}$ (m×n) attends to question words for each document word, and $\vec{A}$ (1×m) represents which document word is of focus given the question.

According to an embodiment, the merging phase (u in Eq. 4) fuses features from the question into the document, such that the subsequent classification layer can focus on span selection. Various embodiments use a similar architecture as in the encoder phase, that is a bidirectional GRU followed by hierarchical self-attention. The following equations provide a high-level overview, although they are provided only as an example and many other formulations are possible:

$$D' = \text{fuse}(\vec{A}Q, \vec{A}\overline{D}) \quad (\text{Eq. 9})$$

$$D'_s = \text{BiGRU}_s(D') \quad (\text{Eq. 10})$$

$$A'_s = \sigma(D'^T_s D') \quad (\text{Eq. 11})$$

$$\overline{D'} = [A'^T_s D'_s; D'] \quad (\text{Eq. 12})$$

where fuse is a feature fusion function, e.g. bilinear or trilinear. Note that during fusion, $\vec{A}\overline{D}$ is expanded to match the size of $\vec{A}Q$. Now $\overline{D'}$ represents question-aware document features with sentence-level view.

Various embodiments may make use of two variants for classification: 1) predicting a boundary of an answer span by multi-pass reading; and 2) predicting an answer phrase by sequence labeling using CRF. According to an embodiment, the design objective of multi-pass reading is to gradually boil down to the region contains the expected answer more precisely, and the purpose of modeling with CRF is to model the whole answer phrase instead of just the boundary words.

Various embodiments conduct multi-pass reading in the classification layer. That is, the model first produces a probability distribution for the starting word of answer span, and then based on that, it predicts a distribution for the ending word. Based on the ending word, the model may predict the distribution of the starting word, and so on so forth. The following equations provide a high-level overview, although they are provided only as an example and many other formulations are possible:

$$U^t = \text{BiGRU}([V^{t-1}; \overline{D}y_{end}^{t-1}]) \quad (\text{Eq. 13})$$

$$y_{beg}^t = \sigma(w^T U^t) \quad (\text{Eq. 14})$$

$$V^t = \text{BiGRU}([U^t; \overline{D}y_{beg}^t]) \quad (\text{Eq. 15})$$

$$y_{end}^t = \sigma(w^T V^t) \quad (\text{Eq. 16})$$

where $U^t$ denotes tuned encodings for locating the starting word at the t-th pass, $V^t$ represents encodings for locating the ending word at the t-th pass, $y_{beg}$ and $y_{end}$ are distributions for the boundary of answer span. At the first pass, $V^0$ is initialized to be $\overline{D}$, and $y^0_{end}$ is initialized evenly.

According to an embodiment, one challenge surrounding prediction using CRF is to maximize its scoring outcome. Various embodiments use two scenarios: 1) one pass reading; and 2) multi-pass reading. In the first case, various embodiments define the scoring function in terms of individual word emission score and label transition score. First, such embodiments use a BiGRU network to further read the merged features. The following equations provide a high-level overview, although they are provided only as an example and many other formulations are possible:

$$D^* = \text{BiGRU}(\overline{D'}) \quad (\text{Eq. 17})$$

For notation, $D^*_i$ is the i-th word vector in $D^*$. Specifically, the sequence level score is defined as:

$$s(d^*, y) = \Sigma_i w_{y_i}^T d_i^* + T_{y_{i-1}, y_i} \quad (\text{Eq. 18})$$

where y is a given sequence of labels, $y_i$ is the label for word i, T is the learnable transition score matrix (3×3), $w_{y_i}$ is the learnable weight vector for label $y_i$. According to an embodiment the goal of prediction is to find labels that maximizes the document level score:

$$y' = \arg\max_y s(\overline{d'}, y) \quad (\text{Eq. 19})$$

With a sequence of predicted BIO labels, the model may select the consecutive span with the highest sequence score, such that the labels are of pattern (B; I; I; . . . ).

For a multi-pass classifier, instead of iteratively predicting the boundary words, embodiments may focus on generating distribution for all words in the answer span. The following equations provide a high-level overview, although they are provided only as an example and many other formulations are possible:

$$D^{*t} = \text{BiGRU}(D^{*t-1}; \overline{D}z^t) \quad (\text{Eq. 20})$$

$$z^t = \sigma(w^T D^{*t}) \quad (\text{Eq. 21})$$

where $D^{*0}$ is initialized to be $\overline{D'}$, and $z^0$ is initialized evenly. At the very last pass of reading, some embodiments attach a CRF layer (Equation 18) on top of the network.

Referring to FIG. 1, in one embodiment, is a flowchart of a method 100 for determining, from a document, an answer to a query using a query answering system. The methods described in connection with the figures are provided as examples only, and shall be understood not to limit the scope of the disclosure. At step 110 of the method, a query answering system is provided. The query answering system implementing these methods can be any of the systems described or otherwise envisioned herein.

At step 120 of the method, the system encodes one or more documents. A document is, for example, anything with multiple sentences comprising a mass of textual information. The document is in digital form and can be a book, website, note, and/or anything else with textual information. At step 130 of the method, the system encodes a query. A query can be any question, query, or interrogation of information which may be found within the document. The query can be provided to the system or received by the system from any remote or local source, including from a user. Receipt of the query may comprise converting the query from one format to another to allow for encoding. Encoding of the document and query is discussed in greater detail with regard to FIG. 3.

At step 140 of the method, the system generates a query-aware document representation. The query-aware document representation comprises alignment between one or more words in one of the plurality of documents and one or more words in the query. Generating a query-aware document representation is discussed in greater detail with regard to FIG. 4.

At step 150 of the method, the system generates a word-to-sentence alignment of the query-aware document representation, resulting in a word-to-sentence attention. Generating a word-to-sentence alignment is discussed in greater detail with regard to FIG. 5.

At step 160 of the method, the system uses the conditional random field classifier to label one or more words in the generated word-to-sentence alignment with one of a plurality of different sequence identifiers (such as the B, I, and O) identifiers described or otherwise envisioned herein. Labelling the words with a sequence identifier is described in greater detail with regard to FIG. 6.

At step 170 of the method, a response to the received query is generated from the identified sequence of the labeled words. At step 180 of the method, the generated response can be shared with another entity such as a remote or local server, user, or other destination.

Figure 2:
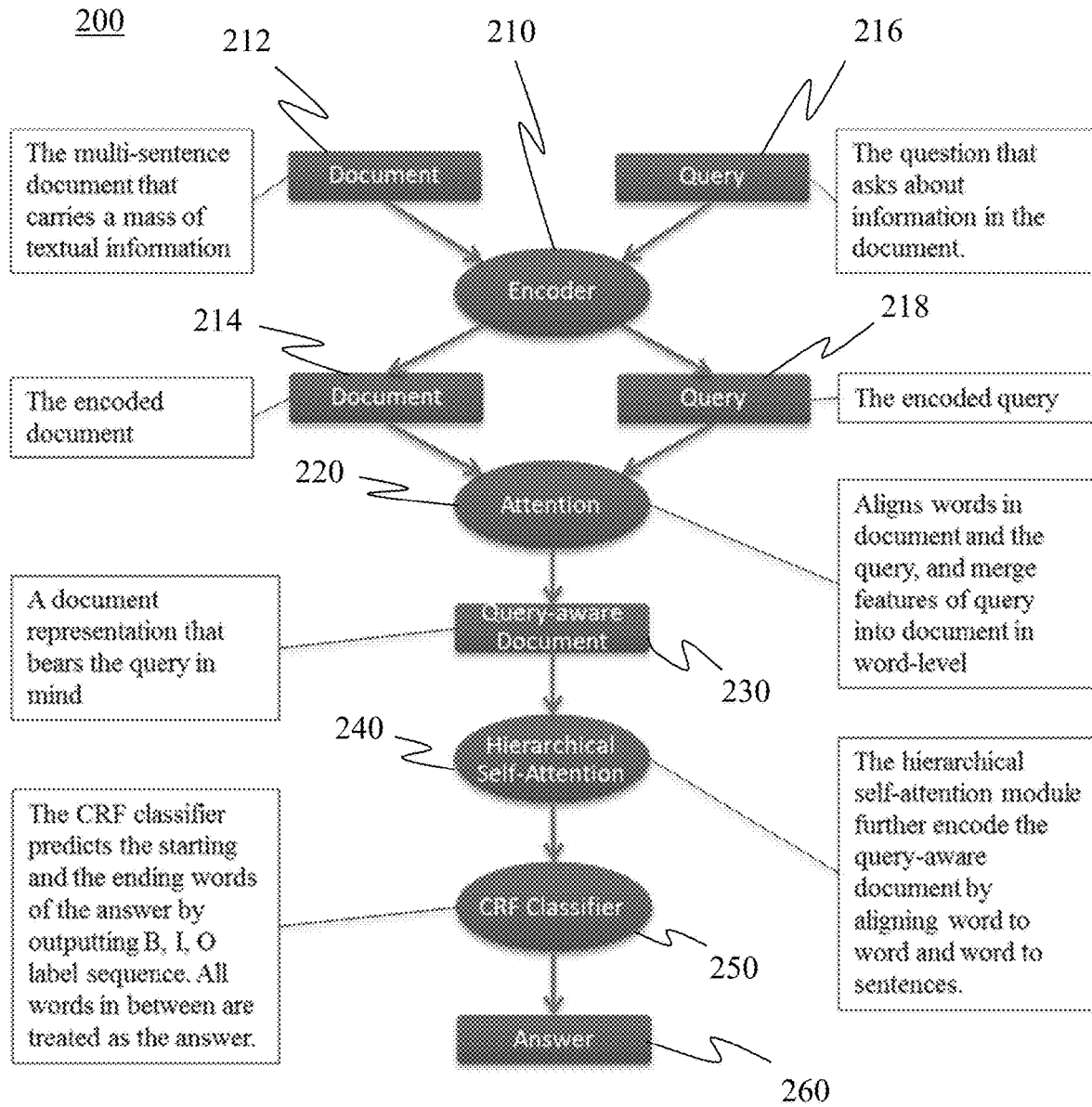
FIG. 2 is a high-level overview of the architecture of a query answering system, in accordance with an embodiment.

Referring to FIG. 2 is a high-level overview of the architecture (200) of an embodiment of the query answering system. The system receives, retrieves, or otherwise comprises a document 212 ("D") and a query 216 ("Q"). The document 212 is any document with answering or potentially answering information, including but not limited to a document comprising multiple sentences with textual information. A query 216 is a question that asks about information found in the document 212. The system takes the input document and the query and converts them into vectors using any of a variety of systems for converting input in one or more forms into a vector used by a system such as the query answering system.

According to an embodiment, the system comprises an encoder 210 which encodes the document and query vectors to produce an encoded document 214 and encoded query 218. These encoded vectors may then be used to determine the specific span of text in the document, in a parsed order determined by the system, that provides an answer 260 to the query 216. Encoder 210 may be or comprise a variety of different mechanisms and methods. Described herein is an example of an encoder 210, although this is only an example and is thus understood not to limit the interpretation of the encoder.

The system 200 further comprises an attention mechanism 220 which aligns words in the document and the query, and merges features of the query into the document at a word level, to produce a query-aware document 230. Described herein is an example of an attention mechanism 220, although this is only an example and is thus understood not to limit the interpretation of the attention mechanism.

The system 200 further comprises a hierarchical self-attention mechanism 240 which further encodes the query-aware document by performing word-to-word alignment and word-to-sentence alignment. Described herein in an example of a hierarchical self-attention mechanism 240, although this is only an example and is thus understood not to limit the interpretation of the hierarchical self-attention mechanism.

The system 200 comprises a CRF classifier 250 that predicts the response word sequence using document words labeled sequence identifiers, to generate a response to the query. Described herein in an example of a CRF classifier 250, although this is only an example and is thus understood not to limit the interpretation of the CRF classifier.

Figure 3:
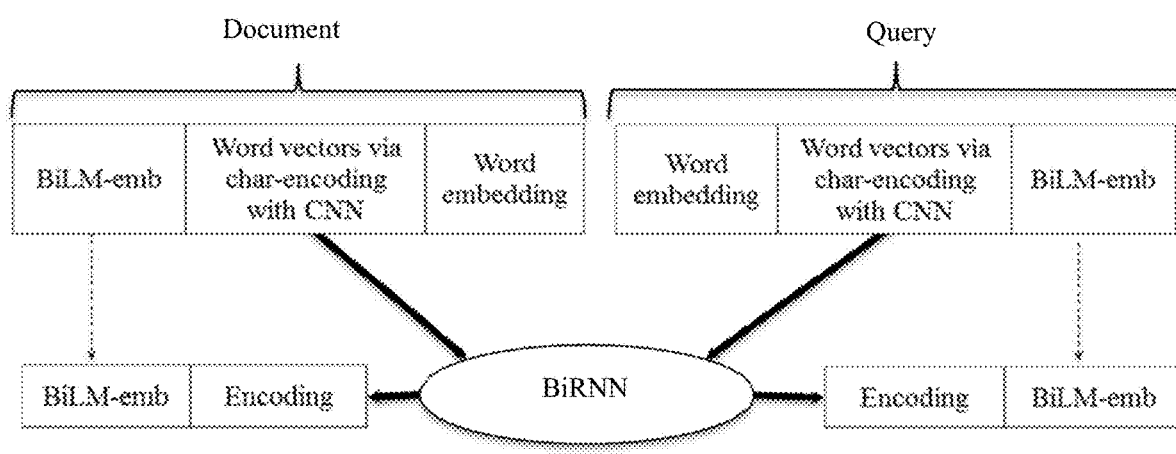
FIG. 3 is a high-level representation of an encoder system, in accordance with an embodiment.

Referring to FIG. 3, in one embodiment, is a high-level representation of an encoder system and process 300. According to an embodiment, the encoder uses three types of encoding on both the document and the query: (1) context dependent encoding from bidirectional language model (BiLM); (2) word vectors via character encodings from a standard convolution network; and 3) word embeddings such as GloVe/Word2Vec. While these three types of encoding are described herein, other types of encoding may be used.

According to an embodiment, word embedding uses a supervised/unsupervised context independent word vector library, such as GloVe/Word2Vec or others. For every word in the document D, there is a d-dimensional vector associated with it. Thus, the embedding variable is of shape m×d, where m is the number of words in the document. Similarly, the query's (Q) embedding variable has shape n×d, where n is the number of words in query. Embeddings are used to capture context-free prior of the example.

The context dependent encoding may use BiLM embeddings generated by bidirectional language model tuned on the dataset of interest, such as, for example, ELMO. This is context-dependent information. A Recurrent Neural Network (RNN) based bidirectional language model is used to scan over each sentence in both of the document and the query, yielding a v-dim vector for each word. The v-dim vector are a weighted sum of hidden states in the two-layer RNN and its corresponding input. The weights are jointly trained with the pipeline. The concatenation of all of these vectors becomes the context dependent encoding of the document and the query. While BiLM is used in this example, other context dependent coding schemes may be used as well.

Word vectors via character encoding with CNN produces word embeddings composed of character-level embeddings. Every character in a word is associated with a k-dim embeddings. Following traditional character CNN, the k-dim vectors in a word are then projected to dimension d using Convolution Neural Networks (CNN), and through max pooling layer, a single d-dim vector is generated for each word. The character embeddings and the CNN are jointly trained with in the architecture. The purpose of this character embedding is to generate better context-free word embeddings for words that are not in the previous word vector library. Further, other types of word encoding using character encoding may also be used. This word encoding is trained during the training phase of the system.

The result of concatenating BiLM encodings, character encodings, and word embedding is a (v+k+d) dimensional vector for each word in the example. That is the document is now vectorized into a m×(v+k+d) matrix or the encoded document 214, and the query into a n×(v+k+d) matrix or the encoded query Q 218.

Next, a bidirectional recurrent neural network (BiRNN) is applied to the encoded document D and the encoded query Q. The BiRNN may be a bidirectional long short-term memory (BiLSTM), bidirectional gated recurrent units (BiGRU), or some other type of BiRNN. The same BiRNN is applied to both the encoded document D and the encoded query Q to encode word-level information. The input is a sequence of word vectors (in the present case, each vector of size v+k+d). The output is a h-dimensional encoding vector for each word. The purpose of this encoder is to generate context-dependent encodings (i.e., the encoding variables) over context-independent/dependent embeddings. The output encoding will be specialized for the future steps in the pipeline.

The outputs of the BiRNN are then concatenated with the BiLM encodings to produce the final encoded document (D) and the final encoded query (Q). This time, the BiLM-emb comes from the same hidden states and input of the bidirectional language model, but they are summed according to different weights. The weights are again jointly trained with the pipeline. Therefore the result of concatenation is a vector of h+d dimension for each word in the Document and the Query. These values D and Q as well as D*Q are then used by the bidirectional attention system.

As noted in step 140 of the method 100 in FIG. 1, and with regard to the attention mechanism 220 of the system 200 in FIG. 2, the system generates a query-aware document representation. The query-aware document representation comprises alignment between one or more words in one of the plurality of documents and one or more words in the query.

Figure 4:
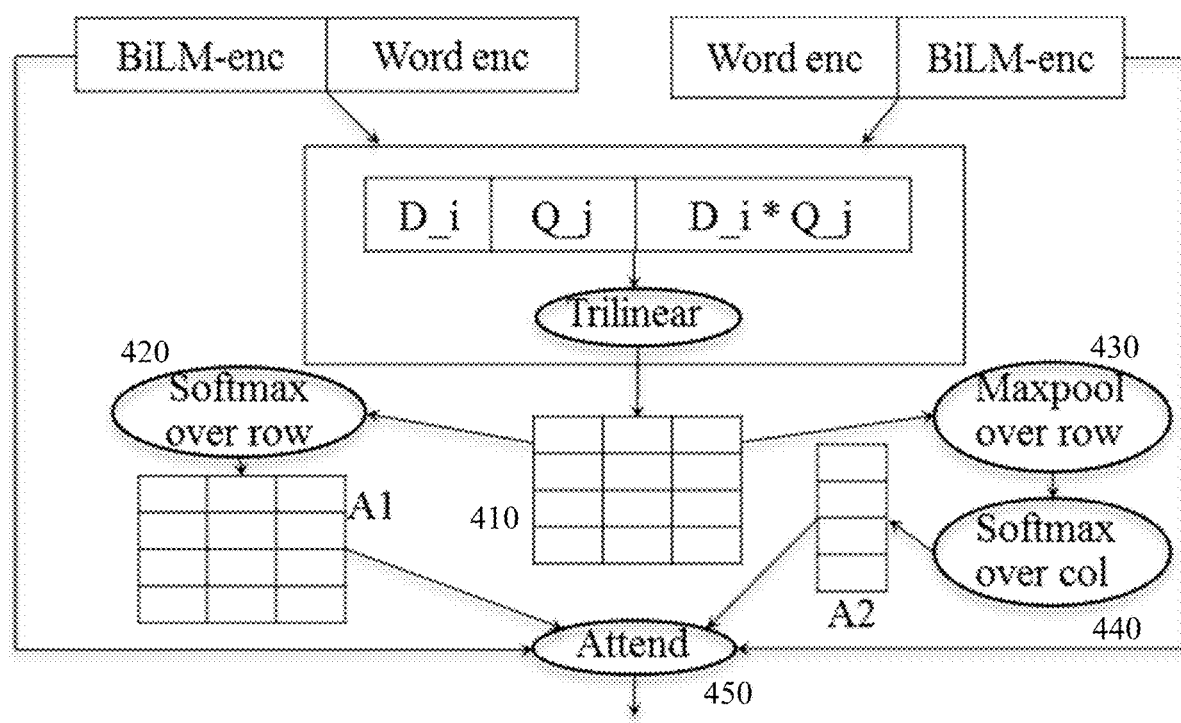
FIG. 4 is a high-level representation of a bidirectional attention mechanism, in accordance with an embodiment.

Referring to FIG. 4, in one embodiment, is a high-level representation of a bidirectional attention mechanism 400 to generate query-aware encodings for the document. This is accomplished, for example, by aligning words in the query with the document and then combining the query with the document into a query aware document.

According to an embodiment, the input to the bidirectional attention mechanism is the output of the encoder 210. For example, according to the embodiment described above, the input is the BiRNN encoder concatenated with the BiLM encodings, where every document/query word has an encoding vector, denoted as D_i and Q_j along with D_i*Q_j.

According to an embodiment, each document word D_i and each query word Q_j and D_i*Q_j are passed into a similarity function, calculated in a trilinear fashion and passing the outcome vector to a linear vector to obtain a scaler value for each similarity score, denoted in the similarity matrix 410 which shows the similarity between all document words and all query words. The similarity matrix 410 is then further condensed by normalizing the similarity matrix 410 row-wise using a softmax function 420 over each row to produce an attention matrix A1.

The similarity matrix 410 also has a maxpool function 430 applied row-wise and this is then normalized column-wise using a softmax function 440 over the columns to produce a column attention matrix A2 that indicates bidirectional attentions. Based on these two attention matrices A1 and A2, encodings from the document and the query are attended by the attend layer 450. The attend layer can be defined as: G=[D, A·Q, D*(A·Q), D*(A2·D)], where [,] means concatenation, [*] means element-wise multiplication, [·] means matrix multiplication. (A2·D) results in a vector, which is expanded to match the dimensionality of D. The result of this phase is query-aware context encodings (G).

As noted in step 150 of the method 100 in FIG. 1, and with regard to the hierarchical self-attention mechanism 240 of the system 200 in FIG. 2, the system further encodes the query-aware document by performing word-to-word alignment and word-to-sentence alignment.

Figure 5:
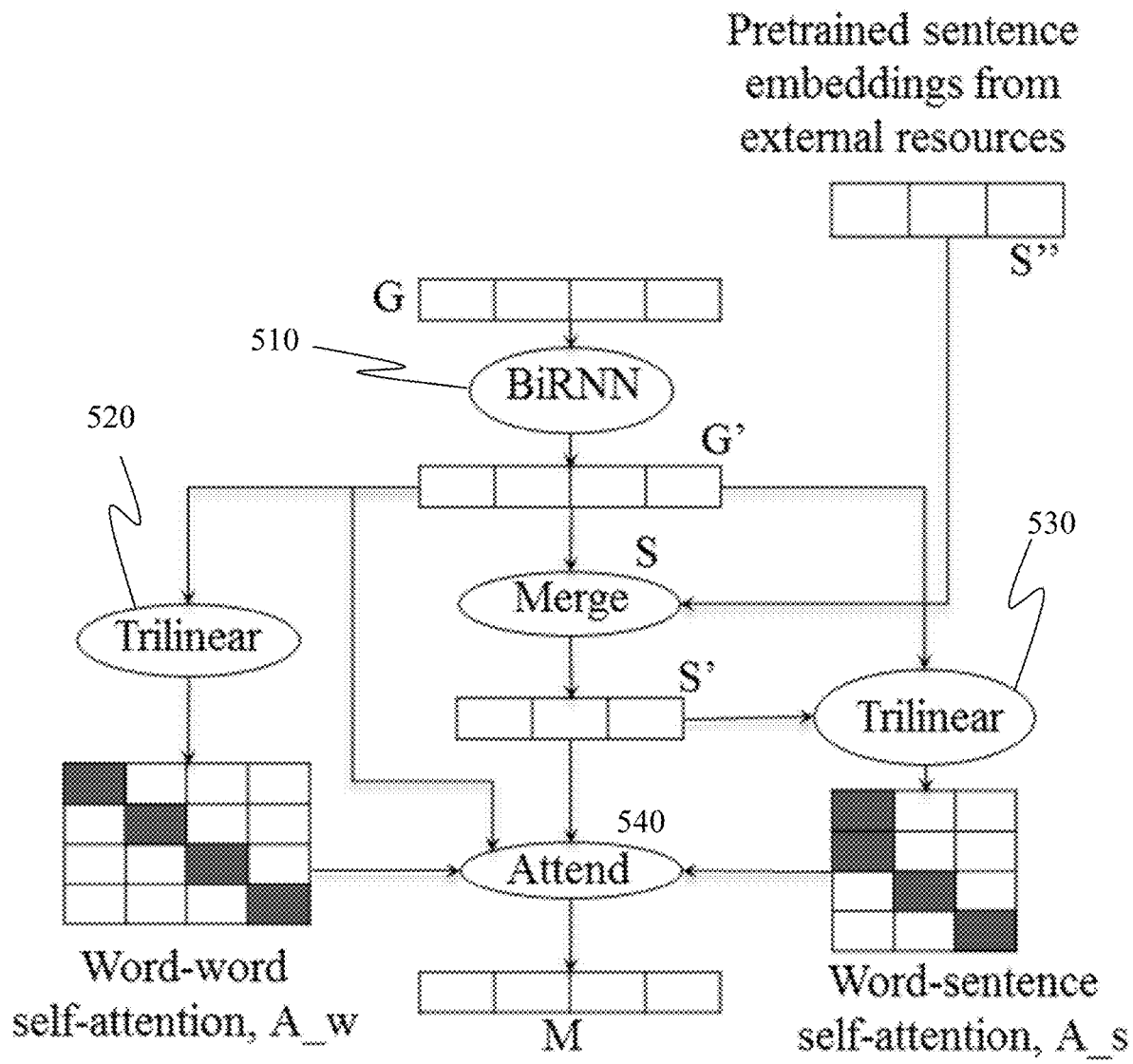
FIG. 5 is a high-level representation of a hierarchical self-attention mechanism, in accordance with an embodiment.

Referring to FIG. 5, in one embodiment, is a high-level representation of a hierarchical self-attention mechanism 500 to encode the query-aware document by performing word-to-word alignment and word-to-sentence alignment. According to an embodiment, the input to the hierarchical self-attention mechanism is the query-aware context encoding (G) from the bidirectional attention mechanism 400.

According to an embodiment, the hierarchical self-attention system further encodes the query aware document by aligning each of the words and sentences in terms of the word. One level of attention is for example to compare a first word with other words nearby to see how they are related to one another. The next level of attention is how is the current word related to the current sentence. The result is an indication of how each word is related to other words and sentences. This results in a better representation of the content that helps to find the span of the answer.

The input G is fed into a BiRNN encoder 510 to merge concatenated features, and the output is denoted as G' to provide a representation of the whole document. Then sentence-level encodings are extracted from G' (not shown), with one vector for each sentence. The sentence level encodings may be either extracted as the last hidden states for every sentence, or maxpooled over the word encodings for each sentence, and other methods may be used as well to extract the sentence level encodings. The sentence encodings may be denoted as S. Optionally, extra sentence-level information may be brought in from additional pretrained resources e.g., InferSent or Universal Sentence Encoder. The sentence features extracted as described above with the sentence features from pretrained resources as described above may be merged with the sentence encodings S. The definition of the merge function may include concatenation followed by optional linear layers. The output is denoted as S' in the figure, where each sentence has a vector.

Each word G'_i interacts with other word G'_j (except itself) via a trilinear function 520 to calculate the similarity score (like the trilinear layer above), resulting in a similarity matrix. The similarity matrix is then normalized row-wise using a softmax function (same as above). For simplicity of the diagram, the normalization unit is omitted here. Optionally, a maxpool operation may also be performed on the matrix. The result is an attention matrix A_w. This results in word-to-word self-attentions.

According to an embodiment, word-to-sentence comparisons are preformed by the system. Each word G'_i interacts with each sentence S'_j (except the sentence that G'_i resides in) by another trilinear layer 530. The result is then normalized row-wise using a softmax function, yielding attention matrix A_s. Optionally, a maxpool operation may also be performed on the matrix. This results in a word to sentence attention.

Next, an attend layer 540 (similar to above) is used to concatenate features as follows: M=[G', A_w·G', G'*(A_w·G'), A_s·S', G'*(A_s·S')]. This result is significantly different from traditional hierarchical self-attention, where word aligns to word and sentence aligns to sentence. Here in the system, eventually the system needs to select the starting/ending words, so the features need to be operated on at word level. Thus, the hierarchical self-attention in a decomposing fashion by using word-to-sentence alignment is proposed. Several benefits of the hierarchical self-attention can be, for example: introducing a hierarchical view at word level; and introducing extra features from external pretrained resources, among other possible benefits.

As noted in step 160 of the method 100 in FIG. 1, and with regard to the CRF classifier 250 of the system 200 in FIG. 2, the system predicts the response word sequence using document words labeled sequence identifiers, to generate a response to the query.

According to an embodiment, the CRF classifier formulates the span prediction challenge—that is, determining which words in a span are appropriate for the response and in which order—into a sequence labeling task. The elements of the span can be labeled or otherwise tagged with a wide variety of different sequence identifiers. According to just one embodiment, the sequence identifiers may comprise identifiers B (indicating the starting word of the answer), I (indicating that the word is inside of answer), and O (indicating that the word is outside of the answer), or similar identifiers, in addition to many other examples. From training examples of the dataset, the system can easily extract ground truth sequence identifiers from spans.

Then, the problem formulation becomes, given an input or span sequence x, to predict a sequence of sequence identifiers y. In one embodiment, that is the B, I, O identifiers. The following equation presents a high-level approach to sequence prediction, although it is provided only as an example and many other formulations are possible:

$$P(y|x, w) = \frac{1}{z} e^{w^T \sum_i \phi(x, y_i, y_{i-1})} \quad \text{(Eq. 22)}$$

where w is the Linear layer in the diagram. According to an embodiment, w_B, w_I, and w_O are absorbed for ease of notation. The transition weight from y_(i-1) to y_i in the diagram is also absorbed in the feature function phi( ). Z is the partition, such as the following possible equation:

$$Z = \sum_{\hat{y}} e^{w^T \sum_i \phi(x, \hat{y}_i, \hat{y}_{i-1})} \quad \text{(Eq. 23)}$$

According to an embodiment, the CRF classifier is trained, with the goal of training is to minimize this loss function in log space. The following equations present a high-level approach, although it is provided only as an example and many other formulations are possible:

$$-\log P(y^*|x,w) \quad \text{(Eq. 24)}$$

$$= \log(Z) - e^{w^T \Sigma i \, \varnothing(x, y_i^*, y_{i-1}^*)} \quad \text{(Eq. 25)}$$

where y* is the ground truth sequence of the sequence identifiers. It involves efficiently computing the partition Z. The system may be trained using traditional methods. For example, a cross entropy loss function may be used, and then a set of training data used to train the model using gradient decent to determine the final model parameters. Other traditional loss functions may be used as well as well as other training methods.

According to an embodiment, the CRF classifier performs inference, with the goal of inference being to get a sequence of BIO sequence identifiers that maximizes the summation of scores. Score is defined as the score at word i plus the transition score:

$$w^T \varnothing(x, y_i, y_{i-1}) = w^T \varnothing(x, y_i) + T(y_i, y_{i-1}) \quad \text{(Eq. 26)}$$

According to an embodiment, the goal of prediction is as follows, although other formulations are possible:

$$y' = \mathrm{argmax}_y P(y \mid x, w) \quad \text{(Eq. 27)}$$

$$= \mathrm{argmax}_y \sum_i e^{w^T \Sigma i \varnothing(x, y_i, y_{i-1})} \quad \text{(Eq. 28)}$$

According to an embodiment, the a Viterbi algorithm is utilized for the arg max operation.

Figure 6:
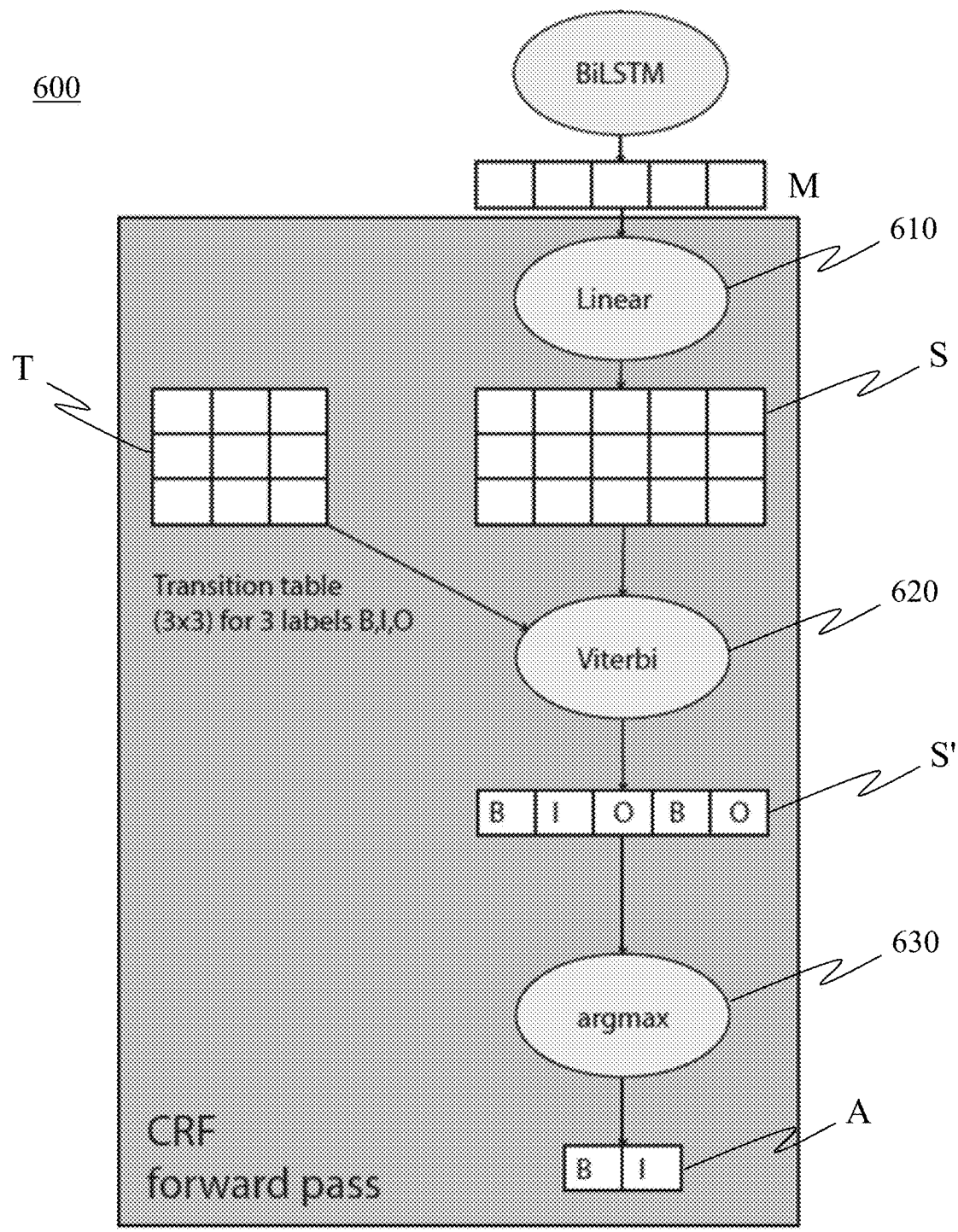
FIG. 6 is a high-level representation of a classifier, in accordance with an embodiment.

Referring to FIG. 6, in one embodiment, is a high-level representation of a CRF classifier 600 to generate a word sequence using document words labeled sequence identifiers, to generate a response to the query. According to an embodiment, the sequence identifier finds the sequence of tags with the maximal summed score. Therefore, according to this embodiment the process is not exactly one-word-by-one-word tagging, but going over all possible combinations and select the one combination with the highest summed score. According to an embodiment, the input to the CRF classifier 600 is the concatenated features M from the attend layer 540 of the hierarchical self-attention mechanism 500. Thus, M feature vectors are the input:

$$\omega = \{\varphi\_1, \ldots, \varphi\_m\} \quad \text{(Eq. 29)}$$

According to an embodiment, a linear layer 610 processes the received input, resulting in matrix S. According to an embodiment of matrix S, S is a score matrix (3×m) for sequence identifiers B, I, and O. For example, $S\_i\hat{}k$ is the score for the i-th word of sequence identifiers k:

$$S\_i\hat{}k = w\_k \cdot \varphi\_i \quad \text{(Eq. 30)}$$

According to an embodiment, the linear layer generates a scalar score for each of the possible B, I, O labels, for each word embedding vector. For example, given a label, there is an associated a trainable vector, and the method uses the vector to dot-product with the word embedding from 600.

According to an embodiment, a Viterbi algorithm 620 is utilized to predict the sequence of sequence identifiers of the highest overall scores. For example, S' can be the sequence of scores associated with the sequence of predicted sequence identifiers y':

$$S' = \{S\_1\hat{}B, S\_2\hat{}I, S\_3\hat{}O, S\_4\hat{}B, S\_5\hat{}O\} \quad \text{(Eq. 31)}$$

According to an embodiment, the system can utilize the transition table T to only output legitimate or authorized scans. For example, the transition table may authorize O to I transitions, since the system wants B to begin the answer.

The Viterbi algorithm 620 results in one or more responses, each comprising a sequence of words each with a respective sequence identifier, configured in an authorized sequence. This is shown as table S' in FIG. 6, which may comprise multiple entries or rows each representing a possible answer. Thus, S' may contain multiple legitimate or authorized spans (answers).

According to an embodiment, the system is configured to select the span within S' with the highest likelihood of being correct. Thus, the system is configured to select the span with the maximal score. The system can determine this, for example, by applying an argmax layer. The argmax layer may be applied using any known method for argmax. According to an embodiment, to select the span with the maximal score the following may be utilized although there are other possibilities:

$$\rho' = \mathrm{argmax}\_\rho \Sigma\_\{i \text{ in } p\} S\_i \quad \text{(Eq. 33)}$$

where ρ denotes legitimate or authorized spans from S'.

The result is a single legitimate or authorized span A, which comprises only components of the final answer in the proper order. This is the preferred or "best" answer to the query from the utilized document(s). The answer can be stored, shared, or otherwise utilized.

Figure 7:
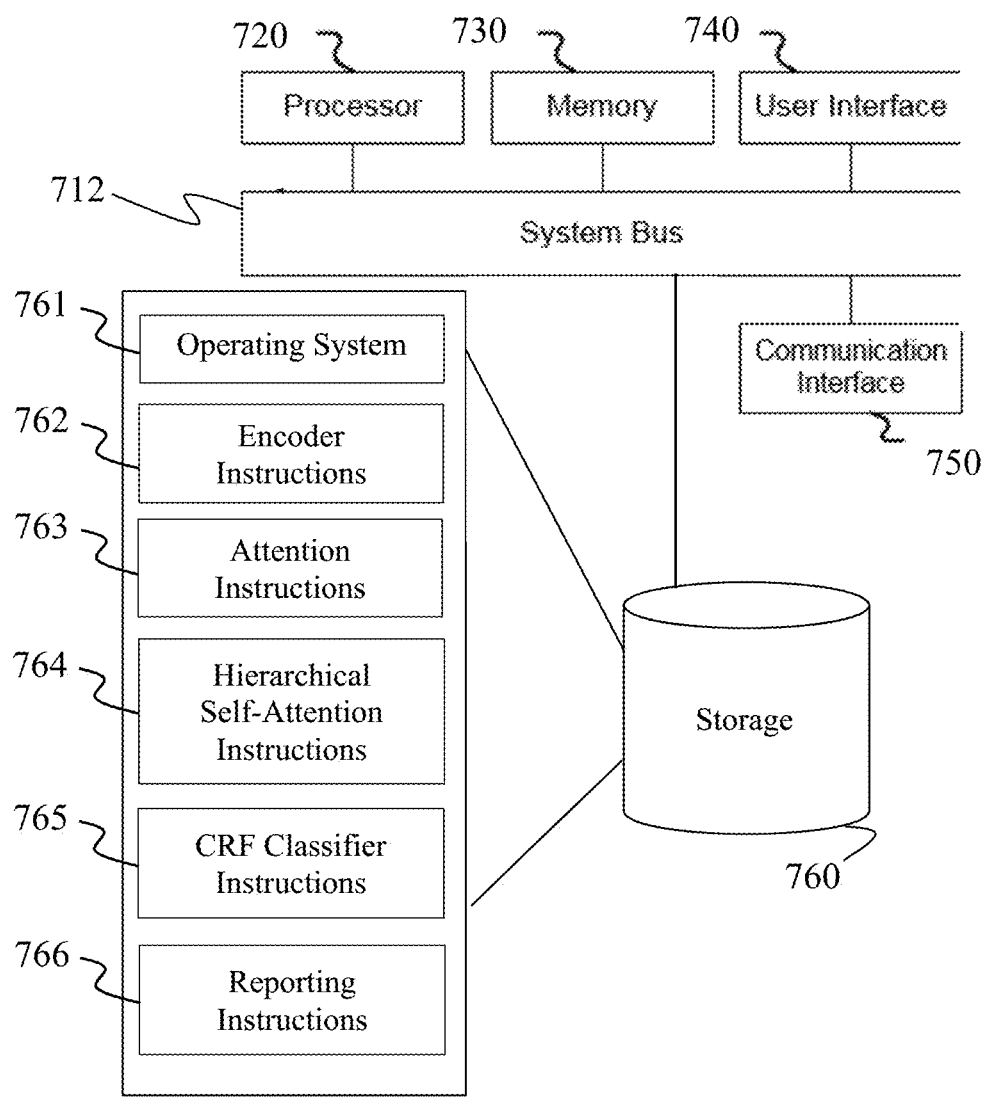
FIG. 7 is a schematic representation of a query answering system, in accordance with an embodiment.

Referring to FIG. 7, in one embodiment, is one embodiment, is a schematic representation of query answering system 700 configured to determine, from a document, an answer to a query. System 700 may be any of the systems described or otherwise envisioned herein, and may comprise any of the components described or otherwise envisioned herein.

According to an embodiment, system 700 comprises one or more of a processor 720, memory 730, user interface 740, communications interface 750, and storage 760, interconnected via one or more system buses 712. It will be understood that FIG. 7 constitutes, in some respects, an abstraction and that the actual organization of the components of the system 700 may be different and more complex than illustrated.

According to an embodiment, system 700 comprises a processor 720 capable of executing instructions stored in memory 730 or storage 760 or otherwise processing data to, for example, perform one or more steps of the method. Processor 720 may be formed of one or multiple modules. Processor 720 may take any suitable form, including but not limited to a microprocessor, microcontroller, multiple microcontrollers, circuitry, field programmable gate array (FPGA), application-specific integrated circuit (ASIC), a single processor, or plural processors.

Memory 730 can take any suitable form, including a non-volatile memory and/or RAM. The memory 730 may include various memories such as, for example L1, L2, or L3 cache or system memory. As such, the memory 730 may include static random access memory (SRAM), dynamic RAM (DRAM), flash memory, read only memory (ROM), or other similar memory devices. The memory can store, among other things, an operating system. The RAM is used by the processor for the temporary storage of data. According to an embodiment, an operating system may contain code which, when executed by the processor, controls operation of one or more components of system 700. It will be apparent that, in embodiments where the processor implements one or more of the functions described herein in hardware, the software described as corresponding to such functionality in other embodiments may be omitted.

User interface 740 may include one or more devices for enabling communication with a user. The user interface can be any device or system that allows information to be conveyed and/or received, and may include a display, a mouse, and/or a keyboard for receiving user commands. In some embodiments, user interface 740 may include a command line interface or graphical user interface that may be presented to a remote terminal via communication interface 750. The user interface may be located with one or more other components of the system, or may located remote from the system and in communication via a wired and/or wireless communications network.

Communication interface 750 may include one or more devices for enabling communication with other hardware devices. For example, communication interface 750 may include a network interface card (NIC) configured to communicate according to the Ethernet protocol. Additionally, communication interface 750 may implement a TCP/IP stack for communication according to the TCP/IP protocols. Various alternative or additional hardware or configurations for communication interface 750 will be apparent.

Database or storage 760 may include one or more machine-readable storage media such as read-only memory (ROM), random-access memory (RAM), magnetic disk storage media, optical storage media, flash-memory devices, or similar storage media. In various embodiments, database 760 may store instructions for execution by processor 720 or data upon which processor 720 may operate. For example, database 760 may store an operating system 761 for controlling various operations of system 700. Database 760 may also store electronic medical records (EMR) 767, which may be electronic medical records or any other data necessary for the KPI forecast, such as data specific to the industry for which the KPI will be generated.

It will be apparent that various information described as stored in database 760 may be additionally or alternatively stored in memory 730. In this respect, memory 730 may also be considered to constitute a storage device and database 760 may be considered a memory. Various other arrangements will be apparent. Further, memory 730 and database 760 may both be considered to be non-transitory machine-readable media. As used herein, the term non-transitory will be understood to exclude transitory signals but to include all forms of storage, including both volatile and non-volatile memories.

While query answering system 700 is shown as including one of each described component, the various components may be duplicated in various embodiments. For example, processor 720 may include multiple microprocessors that are configured to independently execute the methods described herein or are configured to perform steps or subroutines of the methods described herein such that the multiple processors cooperate to achieve the functionality described herein. Further, where one or more components of system 700 is implemented in a cloud computing system, the various hardware components may belong to separate physical systems. For example, processor 720 may include a first processor in a first server and a second processor in a second server. Many other variations and configurations are possible.

According to an embodiment, query answering system 700 may store or comprise one or more algorithms, engines, and/or instructions to carry out one or more functions or steps of the methods described or otherwise envisioned herein. The system may comprise, among other instructions, encoder instructions 762, attention instructions 763, hierarchical self-attention instructions 764, CRF classifier instructions 765, and/or reporting instructions 766. The system may store additional software components required to execute the functionality described herein, which also may control operations of hardware 700.

According to an embodiment, encoder instructions 762 direct the system to encode the document and query vectors to produce an encoded document and encoded query. These encoded vectors may then be used to determine the specific span of text in the document, in a parsed order determined by the system, that provides an answer to the query.

According to an embodiment, attention instructions 763 direct the system to align words in the document and the query, and to merge features of the query into the document at a word level, to produce a query-aware document. Various embodiments comprise a standard approach that uses recurrent network. Specifically, some embodiments use standard bidirectional Gated Recurrent Networks (GRU) which takes as the input word and character embeddings.

According to an embodiment, hierarchical self-attention instructions 764 direct the system to first distill at sentence level, then transfer back to word level for better contextual encoding. Thus, the hierarchical self-attention instructions 764 direct the system to further encode the query-aware document by performing word-to-word alignment and word-to-sentence alignment.

According to an embodiment, CRF classifier instructions 765 direct the system to predict the response word sequence using document words labeled sequence identifiers, to generate a response to the query. According to an embodiment, the CRF classifier formulates the span prediction into a sequence labeling task. The elements of the span can be labeled or otherwise tagged with a wide variety of different sequence identifiers. According to just one embodiment, the sequence identifiers may comprise identifiers B (indicating the starting word of the answer), I (indicating that the word is inside of answer), and O (indicating that the word is outside of the answer), or similar identifiers, in addition to many other examples.

According to an embodiment, reporting instructions 766 direct the system to generate, report, and/or provide the generated/selected best answer to the user via the user interface 740. This could be created in memory or a database, and/or displayed on a screen or other user interface. The generated/selected best answer may be presented to the user together with an alert or indication of confidence. The report may be a visual display, a printed text, an email, an audible report, a transmission, and/or any other method of conveying information. The report may be provided locally or remotely, and thus the system or user interface may comprise or otherwise be connected to a communications system.

The method described or otherwise envisioned herein is a significant technological improvement over existing computerized systems used to automatically generate responses or answers to a query. The system improves the functionality of the computer by, among other things, utilizing data structures that improve the computer's ability to generate a suitable answer. Without these data structures, the computer is unable to generate an answer as responsive, or as quickly, as a computer comprising or utilizing these data structures. Among other data structures in the system that improve the functionality of the computer, the system comprises a transition data structure utilized to direct the system to only generate labeled answering spans with a plurality of approved transitions from one sequence identifier to another. This transition data structure is able to store and provide information or rules that improve the system's ability to generate an improved response, versus systems that don't utilize the transition data structure. The system also comprises a data structure having or storing generated authorized labeled answering spans with a high likelihood of a high score, from which the response to the query is generated. This data structure, comprising words labeled with the claimed sequence identifiers, is unlike prior art data structures or systems in that the sequence identifiers provide a specific sequence rather than simply an identified answer span. This improves the ability of the computer system to generate a responsive answer to a query. With faster generation of an answer and greater ability to generate a better answer as a result of the unique and improved data structures, the system is vastly improved over prior art systems. Accordingly, the systems described or otherwise envisioned herein are a significant technological improvement over existing computerized systems used to automatically generate responses or answers to a query, due in no small part to the unique and improved data structures used by the system.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A method for determining, from a document, an answer to a query using a query answering system, comprising:
    first encoding, using an encoder of the query answering system, one or more documents;
    next encoding, using the encoder, a received query;
    generating, using an attention mechanism of the query answering system, a query-aware document representation comprising alignment between one or more words in one of the encoded plurality of documents and one or more words in the encoded received query;
    generating, using a hierarchical self-attention mechanism of the query answering system, a word-to-sentence alignment of the query-aware document representation;
    labeling, using a conditional random field (CRF) classifier of the query answering system, each of a plurality of words in the generated word-to-sentence alignment with one of a one of a plurality of different sequence identifiers, resulting in one or more possible labeled answering spans; and
    generating, from the one or more possible labeled answering spans, a response to the query.

2. The method of claim 1, further comprising the step of providing the generated response.

3. The method of claim 1, wherein the plurality of different sequence identifiers comprises three different sequence identifiers, comprising B(beginning word), I(inside word), and O(outside word), or a representation thereof.

4. The method of claim 1, wherein the attention module is a bidirectional attention module.

5. The method of claim 1, wherein the steps of encoding further comprise:
  encoding the query and the document into a word embedding using a context independent word vector library; and
  applying a BiRNN on the word embeddings for the query and document.

6. The method of claim 1, wherein the step of labeling each of a plurality of words in the generated word-to-sentence alignment using a (CRF) classifier comprises:
  applying a linear layer on vectors representing the plurality of words to generate one or more possible labeled answering spans (S);
  applying a Viterbi algorithm analysis to the one or more possible labeled answering spans (S), wherein the Viterbi algorithm analysis is configured to predict one or more of the labeled answering spans (S) with a highest likelihood of a high score, to generate a list of one or more labeled answering spans with a high likelihood of a high score (S'); and
  applying an argmax function to select, from the list of one or more labeled answering spans with a high likelihood of a high score (S'), a labeled answering span with the maximal score.

7. The method of claim 6, wherein the labeled answering span with the maximal score is the answer to the query.

8. The method of claim 1, wherein the step of labeling each of a plurality of words in the generated word-to-sentence alignment using a (CRF) classifier comprises a transition table, the transition table configured to direct the system to only generate labeled answering spans (S) with approved transitions.

9. The method of claim 8, wherein the transition table ensures that the generated labeled answering spans (S) comprise a beginning word sequence identifier at the beginning of the span.

10. The method of claim 8, wherein the transition table ensures that the generated labeled answering spans (S) does not comprise a transition from an inside-the-span sequence identifier to a beginning-word sequence identifier.

11. A system configured to improve the ability of a computer system to provide an answer to a received query, comprising:
  a plurality of documents;
  a received query; and
  a processor configured to: (i) first encode, using an encoder, one or more of the plurality of the documents; (ii) next encode, using the encoder, the received query; (iii) generate, using an attention mechanism, a query-aware document representation comprising alignment between one or more words in one of the encoded plurality of documents and one or more words in the encoded received query; (iv) generate, using a hierarchical self-attention mechanism, a word-to-sentence alignment of the query-aware document representation; (v) label, using a conditional random field (CRF) classifier, each of a plurality of words in the generated word-to-sentence alignment with one of a one of a plurality of different sequence identifiers, resulting in one or more possible labeled answering spans; and (vi) generate, from the one or more possible labeled answering spans, a response to the query;
  wherein a memory of the processor is configured to store or comprise at least: (i) a transition data structure utilized to direct the system to only generate labeled answering spans with a plurality of approved transitions from one sequence identifier to another; and (ii) a data structure comprising generated authorized labeled answering spans with a high likelihood of a high score, from which the response to the query is generated.

12. The system of claim 11, wherein the plurality of different sequence identifiers comprises three different sequence identifiers, comprising B (beginning word), I (inside word), and O (outside word), or a representation thereof.

13. The system of claim 11, wherein labeling each of a plurality of words in the generated word-to-sentence alignment using a (CRF) classifier comprises:
  applying a linear layer on vectors representing the plurality of words to generate one or more possible labeled answering spans (S);
  applying a Viterbi algorithm analysis to the one or more possible labeled answering spans (S), wherein the Viterbi algorithm analysis is configured to predict one or more of the labeled answering spans (S) with a highest likelihood of a high score, to generate a list of one or more labeled answering spans with a high likelihood of a high score (S'); and
  applying an argmax function to select, from the list of one or more labeled answering spans with a high likelihood of a high score (S'), a labeled answering span with the maximal score.

14. The system of claim 11, wherein the labeled answering span with the maximal score is the answer to the query.

* * * * *